Feb. 16, 1954  W. H. NEELY ET AL  2,669,293
WIRE SPRING AND WIRE SPRING STRUCTURE
Filed Oct. 20, 1951
4 Sheets-Sheet 1

INVENTOR.
WILLIAM H. NEELY
BY WILLIAM C. SANDOR

ATT.

Feb. 16, 1954 W. H. NEELY ET AL 2,669,293
WIRE SPRING AND WIRE SPRING STRUCTURE
Filed Oct. 20, 1951 4 Sheets-Sheet 2
Fig. 7
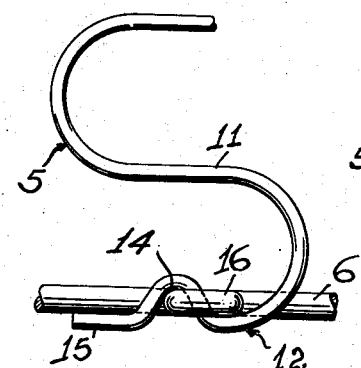
Fig. 3
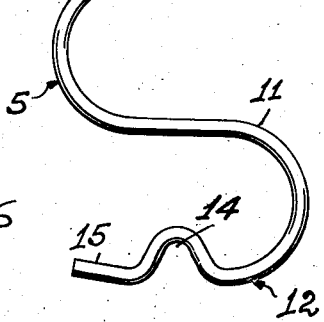
Fig. 5
Fig. 8
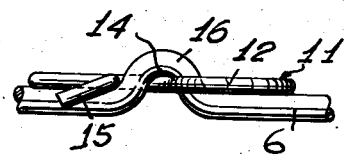
Fig. 4
Fig. 6
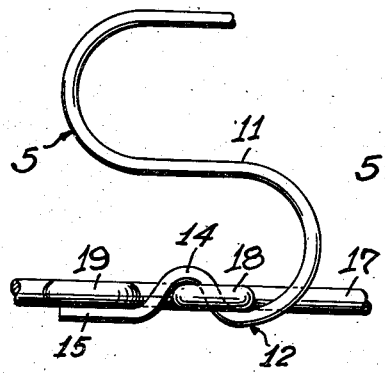
Fig. 9
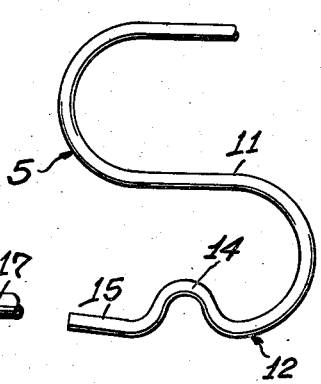
Fig. 11
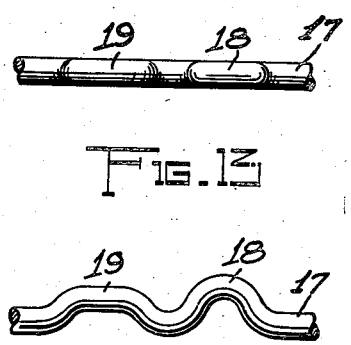
Fig. 13
Fig. 14
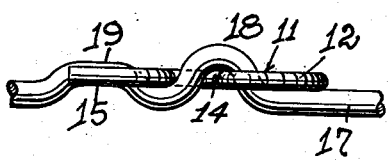
Fig. 10
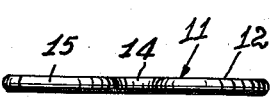
Fig. 12
INVENTOR.
WILLIAM H. NEELY
WILLIAM C. SANDOR
BY
Gustav A. Wolff
ATT.

Feb. 16, 1954    W. H. NEELY ET AL    2,669,293
WIRE SPRING AND WIRE SPRING STRUCTURE
Filed Oct. 20, 1951    4 Sheets-Sheet 3

INVENTOR.
WILLIAM H. NEELY
WILLIAM C. SANDOR
BY
ATT.

Feb. 16, 1954  W. H. NEELY ET AL  2,669,293
WIRE SPRING AND WIRE SPRING STRUCTURE
Filed Oct. 20, 1951
4 Sheets-Sheet 4
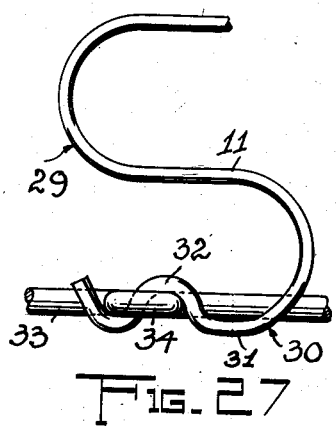
Fig. 27
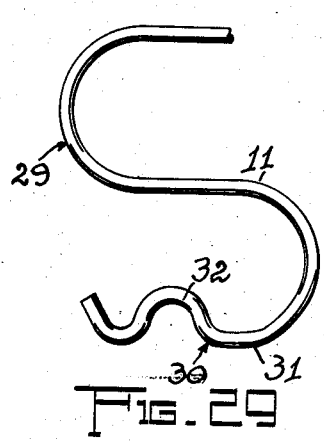
Fig. 29
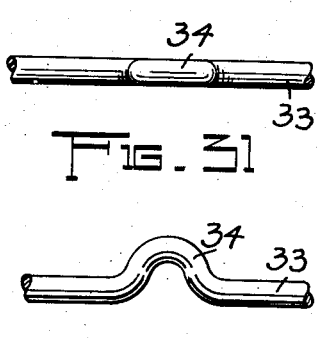
Fig. 31
Fig. 32
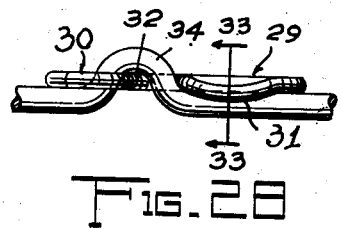
Fig. 28
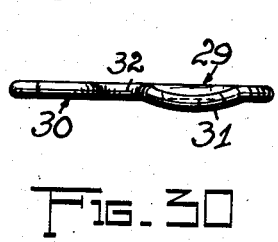
Fig. 30
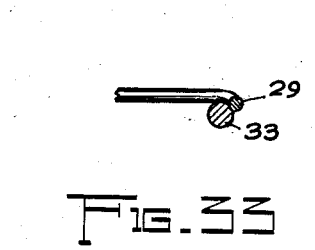
Fig. 33
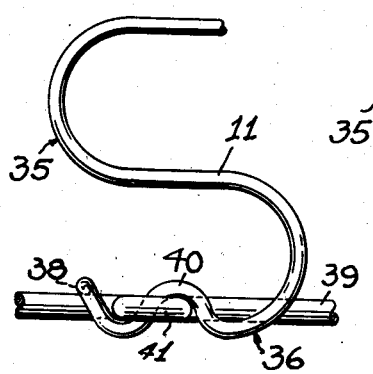
Fig. 34
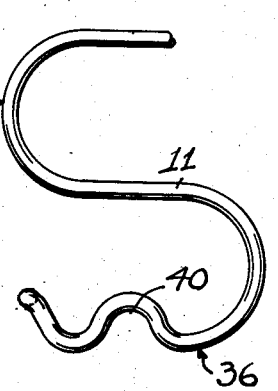
Fig. 36
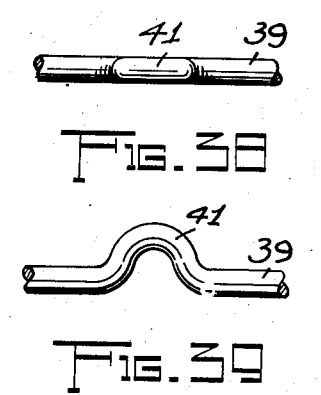
Fig. 38
Fig. 39
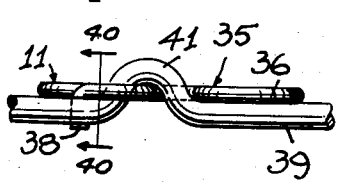
Fig. 35
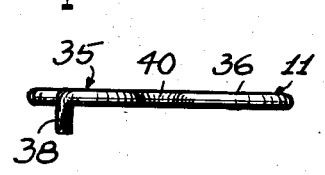
Fig. 37
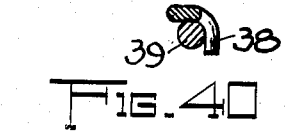
Fig. 40
INVENTOR.
WILLIAM H NEELY
WILLIAM C. SANDOR
BY
ATT.

Patented Feb. 16, 1954

2,669,293

UNITED STATES PATENT OFFICE 2,669,293

WIRE SPRING AND WIRE SPRING STRUCTURE

William H. Neely, Cleveland, and William C. Sandor, Solon, Ohio, assignors to The Universal Wire Spring Company, Bedford, Ohio, a corporation of Ohio Application October 20, 1951, Serial No. 252,284

11 Claims. (Cl. 155—179)

This invention relates to wire spring seat structures for upholstered furniture, cushioned automobile seats, backs or the like in which a frame structure supports and mounts crosswise thereof a plurality of flat, elongated wire springs of sinuous or similar shape. Wire spring seat structures of this type generally include wire springs with a crowned seating surface and yielding supporting means extended from opposite ends of the seating surface, the wire springs by their supporting means being mounted on frame structures embodying specifically constructed rail members, such as tubular or stamped rail members including specific fastening means to effect proper support and mounting of the wire springs. Frame structures of this type are costly in labor and material and mounting of wire springs on such frame structures is slow and expensive.

It is the general object of the present invention to improve and simplify wire spring seat structures of the type referred to above by providing a wire spring seat structure in which a supporting base of simplest construction mounts lengthwise thereof elongated wire spring supporting rods and in which pre-shaped end portions of wire springs cooperate with the supporting rods in mounting the wire springs in a simple and efficient manner on the supporting base crosswise thereof.

This general object of the invention is attained by providing wire spring supporting rods with sharply curved open loops between the opposite ends, forming the end portions of wire springs to be mounted on the supporting rods with identically shaped, sharply curved open loops spaced from the ends of these end portions, interengaging the sharply curved open loops of the supporting rods and end portions in angular relation with respect to each other and locking the interengaged supporting rod and wire spring end portions to each other.

Another object of the invention, therefore, is the provision of wire spring supporting rods and wire springs, both of which include sharply curved open loops interengaged with each other in angular relationship and adapted to be locked in interengaged condition when the supporting rods and springs are in predetermined position with respect to each other.

A further object of the invention is the provision of wire spring supporting rods and sinuously corrugated wire springs, both of which include sharply curved open loops interengaged with each other in angular relation with respect to each other, the wire springs having straight end cross members and having the sharply curved open loops inwardly extended by inwardly bending the middle portions of the straight end cross members in the planes of the springs in axial alignment with their longitudinal axes to permit locking of the springs to the spring rods by cooperative action of the open loops and the areas of the springs and supporting rods adjacent to said open loops when the said open loops are interengaged and the springs are shifted to predetermined positions.

Still another object of the invention is the provision of supporting rods and sinuously corrugated wire springs including sharply bent open loops arranged and constructed as described above, and, furthermore, including locking bends in the supporting rods and springs in areas adjacent to said open loops to effect positive locking of the springs and supporting rods when their open loops are interengaged and the springs are shifted to predetermined positions.

A still further object of the invention is the provision of wire spring supporting rods and sinuously corrugated wire springs, both of which include sharply curved open loops interengaged with each other in angular relation with respect to each other, the wire springs being formed with straight end cross members and having their sharply curved open loops inwardly extended from the middle areas of such straight end cross members in the planes of the springs in axial alignment with their longitudinal axes. Furthermore, the springs include in said straight end portions locking portions extended from said straight end portions in a direction out of the planes of the springs to effect cooperative locking engagement of the springs with the supporting rods when the open loops of the rods and springs are interengaged and the springs shifted to predetermined positions with respect to the rods.

With the above and other objects in view, the invention has certain other marked superiorities which clearly distinguish it from presently known structures and arrangements of this type. These improvements or characteristics, embodying certain novel features of construction and design, are clearly set forth in the appended claims, and several preferred forms of embodiment of the invention used in combination with a wire spring seat structure are hereinafter shown with reference to the accompanying drawings forming part of the specification.

In the drawings:

Fig. 3 is an enlarged fragmentary plan view of the front supporting arm of the corrugated wire spring shown in Figs. 1 and 2 when interengaged and coupled with a spring supporting rod;

Fig. 4 is a front view of Fig. 3;

Fig. 5 is a fragmentary plan view of the front supporting arm of the corrugated wire spring shown in Fig. 3; and Fig. 6 is a front view of Fig. 5;

Fig. 7 is a fragmentary plan view of the spring supporting rod shown in Figs. 3 and 4, and Fig. 8 is a front view of Fig. 7;

Figs. 9 through 14 show a somewhat modified form of the front supporting arm of a corrugated wire spring interengaged and connected with a somewhat modified form of a spring supporting rod. In these figures:

Fig. 9 is a fragmentary plan view similar to Fig. 3;

Fig. 10 is front view of Fig. 9;

Fig. 11 is a fragmentary plan view of the modified front supporting arm of the corrugated wire spring;

Fig. 12 is a front view of Fig. 11;

Fig. 13 is a fragmentary plan view of the modified spring supporting rod; and

Fig. 14 is a front view of Fig. 13;

Figure 15:
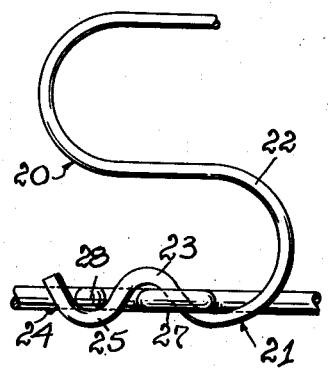
Figure 17:
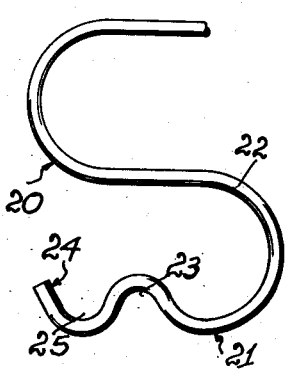
Figure 19:
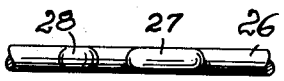
Figure 16:
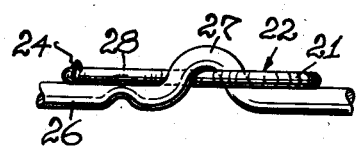
Figure 18:
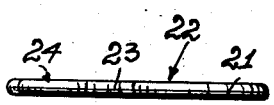

Figs. 15 through 26 show two other closely related, modified forms of the front supporting arm of a corrugated wire spring interengaged and connected with other modified forms of spring supporting rods; that is, the forms shown in Figs. 15 through 20 and Figs. 21 through 26 differentiate only in the rearrangement of their locking elements on the spring supporting rod. In these figures:

Fig. 15 is a fragmentary plan view similar to Figs. 3 and 9;

Fig. 16 is a front view of Fig. 15;

Fig. 17 is a fragmentary plan view of the modified front supporting arm of the corrugated wire spring;

Fig. 18 is a front view of Fig. 17;

Fig. 19 is a fragmentary plan view of the modified spring supporting rod; and

Figure 20:
Figure 21:
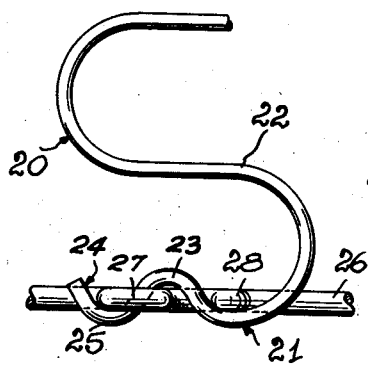
Figure 23:
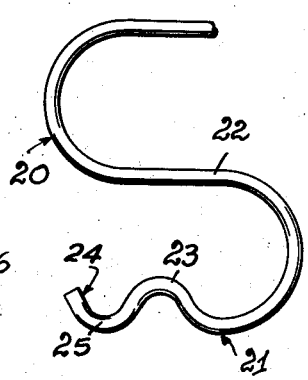
Figure 25:
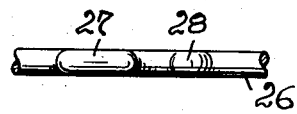
Figure 22:
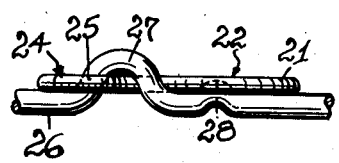
Figure 24:
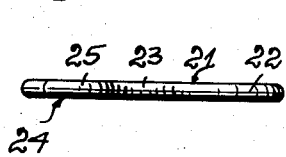

Fig. 20 is a front view of Fig. 19;

Fig. 21 is a fragmentary plan view similar to Fig. 15;

Fig. 22 is a front view of Fig. 21;

Fig. 23 is a fragmentary plan view of the modified front supporting arm of the corrugated wire spring;

Fig. 24 is a front view of Fig. 23;

Fig. 25 is a fragmentary plan view of the modified spring supporting rod; and

Figure 26:
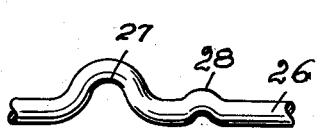

Fig. 26 is a front view of Fig. 25;

Figs. 27 through 33 show still another modified form of the front supporting arm of a corrugated wire spring interengaged and connected with a spring supporting rod. In these figures:

Fig. 27 is a fragmentary plan view similar to Figs. 3, 9, etc.

Fig. 28 is a front view of Fig. 27;

Fig. 29 is a fragmentary plan view of the front supporting spring arm of the corrugated wire spring;

Fig. 30 is a front view of Fig. 29;

Fig. 31 is a fragmentary plan view of the spring supporting rod;

Fig. 32 is a front view of Fig. 31; and

Fig. 33 is a sectional view taken on line 33—33 of Fig. 28;

Figs. 34 through 40 show still another modified form of the front supporting arm of a corrugated wire spring interengaged and connected with a spring supporting rod. In these figures:

Fig. 34 is a fragmentary plan view similar to Figs. 3, 9, etc.

Fig. 35 is a front view of Fig. 34;

Fig. 36 is a fragmentary plan view of the front supporting spring arm of the corrugated wire spring;

Fig. 37 is a front view of Fig. 36;

Fig. 38 is a fragmentary plan view of the spring supporting rod;

Fig. 39 is a front view of Fig. 38; and

Fig. 40 is a sectional view taken on line 40—40 of Fig. 35.

Figure 1:
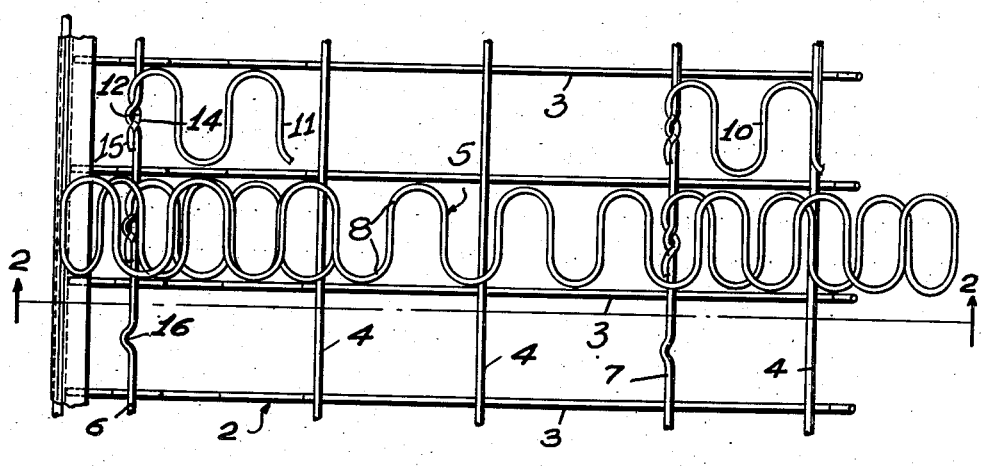
Fig. 1 is a fragmentary plan view of a wire supporting base having mounted thereon spring supporting rods and corrugated wire springs interengaged and coupled with the spring supporting rods in accordance with the invention.
Figure 2:
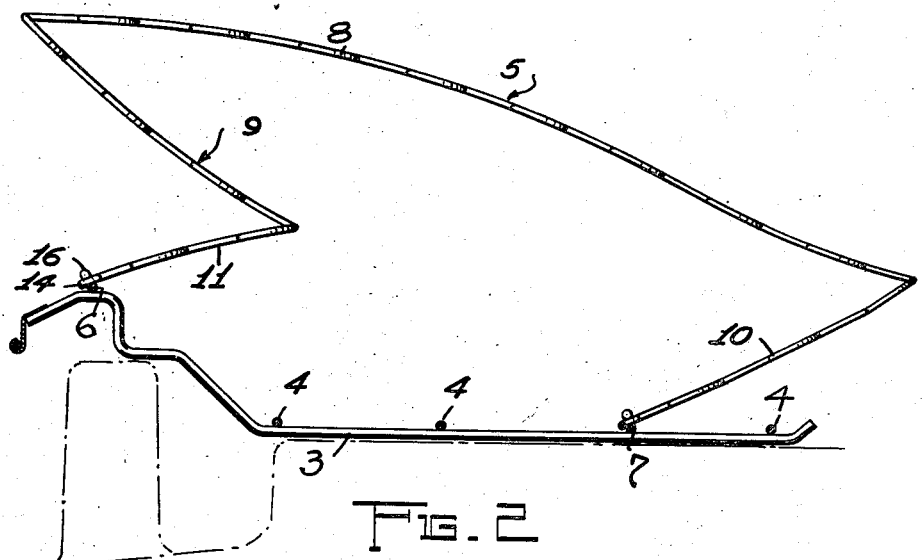
Fig. 2 is a sectional view on line 2—2 of Fig. 1.

Referring now more particularly to the exemplified forms of the invention shown in the drawings, all of which may readily and easily be used in connection with any type of wires or wire springs, but are particularly suitable for elongated, sinuously corrugated wire springs, the supporting base or frame structure 2 shown in Figs. 1 and 2 embodies a plurality of heavy, parallelly arranged, spaced wire stringers 3 shaped to fit their particular purpose and a plurality of straight wire cross members 4 extended crosswise of wire stringers 3 and welded thereto at the contact points with these stringers to form a rigid and sturdy wire spring supporting base. Frame structure 2 has mounted thereon a plurality of sinuously corrugated wire springs 5 which extend parallel to stringers 3 and are coupled with and supported by front and rear wire spring supporting rods 6 and 7 extended at a right angle to springs 5 crosswise over wire stringers 3 in parallel relation with respect to wire cross members 4. The wire spring supporting rods 6 and 7 are welded to wire stringers 4 at their contact points therewith.

Elongated, sinuously corrugated wire springs 5 are made of steel wire bent to sinuous shape so that their loops 8 extend substantially parallel to each other and permit of longitudinal yielding stretching of the springs under load. At the front end each spring includes an integral, rearwardly and downwardly extended, sinuously corrugated, V-shaped front supporting arm 9 and at the rear end a forwardly and downwardly extended, sinuously corrugated, rear supporting arm 10. These front and rear supporting arms are coupled and connected with the front and rear wire spring supporting rods 6 by the differently constructed coupling connections disclosed herein. Thus in the exemplified form of the invention shown in Figs. 1 through 8, the V-shaped front supporting arm of each sinuously corrugated wire spring has lower arm portion 11 of supporting arm 9, at its free end, provided with a cross member 12 extended at a right angle to the axis of such arm portion and has arranged in such cross member, in axial alignment with the longitudinal axis of the arm portion and in its plane, a sharply bent, inwardly extended, open loop 14. Cross member 12, which furthermore includes an end portion 15, preferably slightly bent inwardly in the plane of lower arm portion 11, is coupled with and connected to front spring supporting rod 6. For such purpose front spring supporting rod 6 includes in laterally spaced relation a plurality of sharply bent open loops 16, one for each lower arm portion 11 of sinuously corrugated wire springs 5. These open loops in spring supporting rod 6 extend upwardly from frame structure 2 and permit interengagement of open loops 14 of spring 5 with the respective open loops 16 of front spring supporting rod 6 when in proper angular relation with respect to each other. Springs 5 and spring supporting rods 6 are positively interlocked with each other when by rotation of springs 5 their bent end portions 15 are engaged with the body of spring supporting rods 6 to partly wrap the body of bent end portions 15 around the body of spring supporting rod 6. A more positive locking engagement of the springs 5 and spring supporting rod 6 is effected by bending end portions 15 with a twisting motion around the body of spring supporting rod 6 to the position disclosed in Fig. 3.

Mounting, coupling and interlocking of springs 5 with spring supporting rod 6 by interengaging their open loops 14 and 16 in angular relation to each other and locking the springs to the supporting rod by wrapping and bending the end portions 15 of cross members 12 around the body of spring supporting rod 6 adjacent to its open loops 16 effects rigid, simple and economic coupling of springs 5 with spring supporting rod 6, which coupling can quickly and readily be consummated and released and does not interfere with the action of springs 5 even when under load.

Mounting and coupling of rear supporting arms 10 of springs 5 to rear spring supporting rods 7 is effected in a manner similar to mounting and coupling of springs 5 to front supporting rod 6 as will readily be seen from inspection of Fig. 2 of the drawings.

The modified form of the invention shown in Figs. 9 through 14 is similar to the form of the invention disclosed in Figs. 1 through 8 with the exception that springs 5 of the modified form are coupled to a somewhat different spring supporting rod 17. Thus spring supporting rod 17 includes in addition to open loops 18, similar to open loops 16 of spring supporting rod 6 and adjacent to loops 18, offset portions 19 which extend in the plane of the latter open loops and permit locking of the end portions 15 of cross members 12 when the sides of offset portions 19 of spring supporting rod 17 are engaged by end portions 15 in line contacts below the longitudinal axes of such offset portions. This locking action which is positive is effected when springs 5 and spring supporting rod 17 are shifted to predetermined positions with respect to each other.

The modified form of the invention shown in Figs. 15 through 20 includes a spring 20 which has its cross member 21 at the free end of supporting arm 22 formed with an inwardly extended open loop 23 arranged and constructed similar to open loop 14 of spring 5 (see Figs. 3 through 6) and, in addition has end portion 24 of cross member 21 formed with an outwardly extended open loop 25 adjacent to open loop 23. Spring 20 is coupled with a spring supporting rod 26 embodying open loops 27 which are arranged and constructed similar to the open loops 16 in spring supporting arm 6 (see Figs. 7 and 8) and including adjacent to said open loops curved bump portions 26 extended in the plane of open loops 27. Curved bump portions 28 cooperate with outwardly extended open loop 25 in end portion 24 to effect locking of spring 20 to spring supporting rod 26 when the spring and supporting rod have their open loops 23 and 27 interengaged and are shifted to predetermined position in which an outwardly extended open loop 27 partly encircles curved bump portion 28. In this form of the invention outwardly extended open loop 27 is yieldingly forced over curved bump portion 28 to effect a snap-like locking action of cross member 21 when shifted to a predetermined position with respect to spring supporting rod 26.

The modified form of the invention shown in Figs. 21 through 26 of the drawings is similar to the form of the invention shown in Figs. 15 through 20 with the exception that spring supporting rod 26 is turned 180 degrees to change the relative position of curved bump portions 28 with respect to open loops 27.

In this form of the invention spring supporting rod 26 has its outwardly extended open loop 25 interengaged with open loop 27 and cross member 21 cooperates with curved bump portion 28 in locking the spring in predetermined position with respect to spring supporting rod 26 with snap-like action to said rod.

The modified form of the invention disclosed in Figs. 27 through 33 shows a spring 29 which has an end cross member 30 formed substantially similar to the end cross member 21 of spring 20 (see Fig. 17) with the exception that cross member 30 has its inner end portion 31 adjacent to inwardly extended open loop 32 bent downwardly to extend such inner end portion out of the plane of the spring and yieldingly hug the body of the spring supporting rod 33 when open loops 32 and 34 of cross member 30 and spring supporting rod 33 in angular relation with respect to each other are interengaged and spring 29 and spring supporting rod 33 are in predetermined position with respect to each other.

Finally, the modified form of the invention disclosed in Figs. 34 through 40 shows a spring 35 in which end cross member 36 is formed substantially similar to end cross member 21 of spring 20 (see Fig. 17) with the exception that end cross member 36 at its outer end adjacent to outwardly extended open loop 37 includes a downward extension 38 arranged at a right angle to the plane of spring 35 to effect non-rotatable interlocking of spring 35 with spring supporting rod 39 when open loops 40 and 41 of the spring and spring supporting rod are interengaged with each other and in predetermined position with respect to each other.

It is, of course, to be understood that other modifications and forms may be resorted to without departure from the spirit of the invention or the scope thereof as defined by the appended claims.

Having thus described our invention what we claim is:

1. In a wire spring structure a wire supporting rod and a sinuously corrugated, flat, wire spring member removably, non-rotatably coupled with and supported by the wire supporting rod, said wire supporting rod including integrally formed therewith an open loop arranged in offset relation with respect to the axis of said wire supporting rod, and said wire spring member including at its end a cross member formed between its ends with an open loop arranged in offset relation with respect to the axis of said cross member, said open loops of the wire supporting rod and wire spring member being interengaged in angular relation with respect to each other and a locking portion on said cross member to non-rotatably couple and lock the wire supporting rod and wire spring member in predetermined position to each other.

2. A wire spring structure as described in claim 1, wherein the sinuously corrugated, flat, wire spring has said cross member adjacent to the open loop therein bent out of the plane of the spring for locking engagement with the body of the wire supporting rod.

3. A wire spring structure as described in claim 2, wherein the said cross member has its outer end portion bent out of the plane of the sinuously corrugated, flat, wire spring and such end portion partly wrapped around the body of said wire supporting rod adjacent to the open loop therein.

4. A wire spring structure as described in claim 2, wherein the said cross member has its inner end portion curved downwardly out of the plane of the sinuously corrugated, flat, wire spring and the curved portion partly wrapped around the body of said wire supporting rod.

5. In a wire spring structure a wire supporting rod and a sinuously corrugated, flat, wire spring member removably, non-rotatably coupled with and supported by the wire supporting rod, said wire supporting rod including integrally formed therewith an upwardly extended open loop and said wire spring member including at its end a cross member formed with an inwardly extended open loop and arranged in the plane of the sinuously corrugated, flat, wire spring member in axial alignment therewith, said open loops of the wire supporting rod and wire spring member being interengaged in angular relation with respect to each other and cooperating locking portions formed as integral portions of said supporting rod and cross member to non-rotatably couple and lock the wire supporting rod and wire spring member in predetermined position to each other.

6. A wire spring structure as described in claim 5, wherein the sinuously corrugated, flat, wire spring has said cross member adjacent to the open loop therein bent out of the plane of the spring for yielding locking engagement with the body of the wire supporting rod.

7. In a wire spring structure a wire supporting rod and a sinuously corrugated, flat, wire spring member removably and non-rotatably coupled with and supported by the wire supporting rod, said wire supporting rod including integrally formed therewith an upwardly extended open loop and a curved, upwardly extended bump, and said wire spring member including at its end a cross member formed with an inwardly extended open loop arranged in the plane of the sinuously corrugated, flat, wire spring member in axial alignment therewith and an outwardly extended similar open loop arranged in the plane of said first open loop of said wire member, one of said open loops of said wire member and the open loop of said wire supporting rod being interengaged in angular relation with respect to each other and the other one of said open loops partly encircles the upwardly extended bump in said wire supporting rod to effect in predetermined position of said wire supporting rod and wire spring member a non-rotatable, yieldingly removable, locking engagement between the wire supporting rod and the wire spring member.

8. A wire spring structure as described in claim 7, wherein the inwardly extended, open loop of said wire spring member is interengaged with the open loop of said wire supporting rod, and wherein the outwardly extended, open loop of said wire spring member partly encircles the bump in said wire supporting rod adjacent to the open loop therein.

9. A wire spring structure as described in claim 7, wherein the outwardly extended, open loop of said wire spring member is interengaged with the open loop of said wire supporting rod, and wherein the inwardly extended, open loop of said wire spring member partly encircles the bump in said wire supporting rod adjacent to the open loop therein.

10. In a wire spring structure a wire supporting rod and a sinuously corrugated, flat, wire spring member removably, non-rotatably coupled with and supported by the wire supporting rod, said wire supporting rod including integrally formed therewith an upwardly extended open loop and said wire spring member including at its end a cross member formed with an open loop symmetrically arranged with respect to the longitudinal axis of said wire spring, said open loops of the wire supporting rod and wire spring member being interengaged in angular relation with respect to each other and cooperating locking portions to non-rotatably couple and lock the wire supporting rod and wire spring member in predetermined position to each other.

11. In a wire spring structure a wire supporting rod and a sinuously corrugated, flat, wire spring member removably, non-rotatably coupled with and supported by the wire supporting rod, said wire supporting rod including integrally formed therewith an open loop arranged in offset relation with respect to the axis of said wire supporting rod, and said wire spring member including at its end a cross member formed between its ends with an open loop arranged in offset relation with respect to the axis of said cross member, said open loops of the wire supporting rod and wire spring member being interengaged in angular relation with respect to each other to engage said supporting rod by said cross member in axially and laterally spaced areas of such supporting rod, and a locking portion on said cross member to non-rotatably couple and lock the wire supporting rod and wire spring member in predetermined position to each other.

WILLIAM H. NEELY.
WILLIAM C. SANDOR.

References Cited in the file of this patent

UNITED STATES PATENTS

| Number | Name | Date |
|---|---|---|
| 611,648 | Robinson | Oct. 4, 1898 |
| 1,859,630 | Oldham | May 24, 1932 |
| 2,332,124 | Young et al. | Oct. 19, 1943 |